United States Patent [19]

Faulkner

[11] 4,220,273

[45] Sep. 2, 1980

[54] DEVICE FOR SEPARATING A MICROSCOPE SLIDE INTO TWO SEPARATE SECTIONS

[75] Inventor: Albert A. Faulkner, Conshohocken, Pa.

[73] Assignee: SmithKline Corporation, Philadelphia, Pa.

[21] Appl. No.: 35,312

[22] Filed: May 2, 1979

[51] Int. Cl.³ ............................................. C03B 33/02
[52] U.S. Cl. ........................................ 225/96.5; 225/2
[58] Field of Search ................................... 225/96.5, 2

[56] References Cited

U.S. PATENT DOCUMENTS

| | | | |
|---|---|---|---|
| 1,972,210 | 9/1934 | Waldron | 225/96.5 |
| 2,051,698 | 8/1936 | Gaskell | 225/96.5 |
| 3,715,067 | 2/1973 | Hunsinger et al. | 225/96.5 |
| 3,908,878 | 9/1975 | Blum | 225/96.5 |

Primary Examiner—Frank T. Yost
Attorney, Agent, or Firm—Harding, Earley & Follmer

[57] ABSTRACT

A device for separating a microscope slide into two separate sections has a arm mounted on a horizontal pivot carrying a downwardly extending glass cutter. A releasable member maintains the arm in an elevated position. A slider advances a microscope slide under the cutter releasing the releasable member to lower the cutter onto the microscope slide. A striker on the arm strikes one section of the cut slide to separate it from the other section as the cutter drops off the trailing edge of the slide. The slide then raises the arm for the restoration of the releasable means preferably by a cam attached to the arm. Advantageously, the releasable member is spring biased to its position to maintain the arm in an elevated position and is released by a cam attached to the slide. Advantageously, the slide is supported on a bed having an opening for the downward passage of the section of the slide struck by the striker with the opening having a edge underlying the cut made in the slide by the cutter. Advantageously, the slide is removable for cleaning purposes.

13 Claims, 16 Drawing Figures

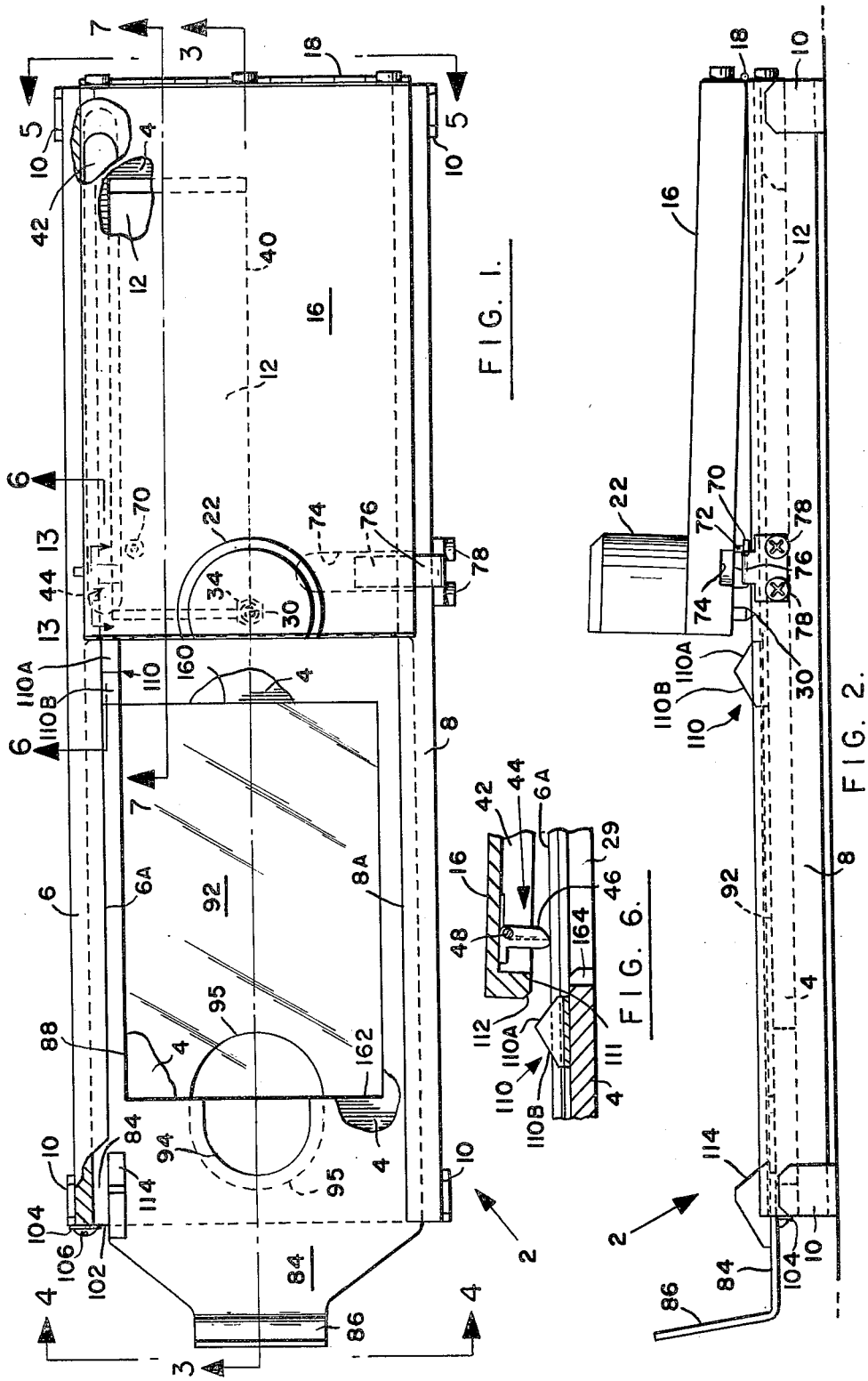

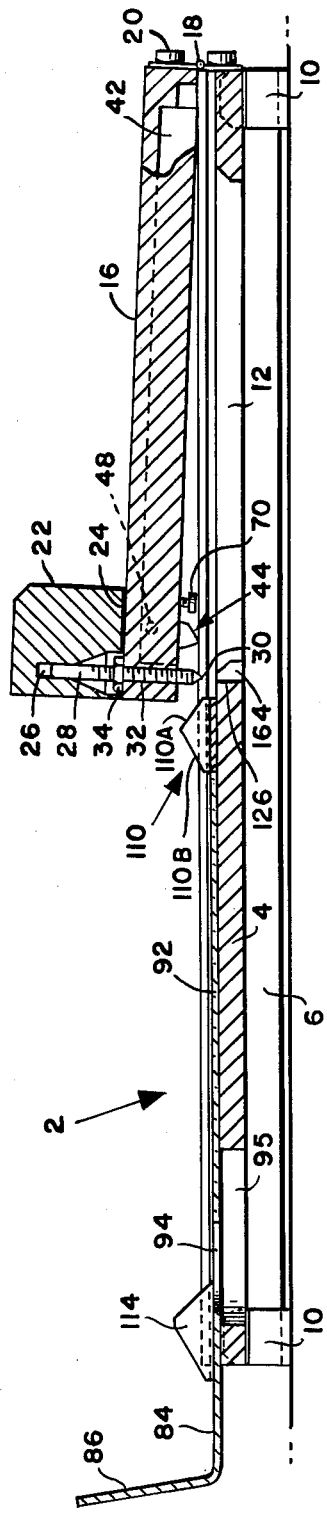

DEVICE FOR SEPARATING A MICROSCOPE SLIDE INTO TWO SEPARATE SECTIONS

TECHNICAL FIELD

This invention is in the field of microscope slides.

BACKGROUND OF PRIOR ART

This invention is particularly useful with glass microscope slides used for the examination of blood smears. Blood smears are usually made on the long axis of a 25×75 mm. slide. A large part of the smear is of no use because only a small monolayer area is used for examination. On the other hand, the 25 mm. axis of such a slide is too short to make a satisfactory blood smear. It has been found that by using a slide having a substantially larger transverse axis, for example, a 50×75 mm. slide, it is possible to make a number of smears, for example, 5, by smearing in the direction of the transverse axis. However, such larger slides cannot be accommodated in widely used examination devices which are designed to handle 25×75 mm. slides. The device of this invention functions to separate a larger slide into two separate sections with the section having the monolayer of each smear being the desired size, typically, 25×75 mm. which is the size conventionally used for examination and fits into conventional storing devices.

BRIEF SUMMARY OF THE INVENTION

A device for separating a microscope slide into two separate sections has an arm mounted on a horizontal pivot carrying a downwardly extending glass cutter. A releasable member maintains the arm in a partially elevated position. A pusher advances a microscope slide under the cutter releasing the releasable member to lower the cutter onto the microscope slide. A striker on the arm strikes one section of the cut slide to separate it from the other section as the cutter drops off the trailing edge of the slide. Preferably said other section is held down during the striking. The slide then raises the arm for the restoration of the releasable means preferably by a cam attached to the pusher. Advantageously, the releasable member is spring biased to its position to maintain the arm in an elevated position and is released by a cam attached to the pusher. Advantageously, the slide is supported on a bed having an opening for the downward passage of the section of the slide struck by the striker with the opening having an edge underlying the cut made in the slide by the cutter. Preferably, the pusher is removable for cleaning purposes.

BRIEF DESCRIPTION OF THE DRAWINGS

FIG. 1 is a plan view of a device in accordance with the invention;

FIG. 2 is a side elevation of the device of FIG. 1;

FIG. 3 is a vertical section of the device of FIG. 1 taken on the plane indicated by the line 3—3 in FIG. 1;

FIG. 3A is an enlarged view of the cutter of the device of FIG. 1;

FIG. 4 is a front elevational view of the device of FIG. 1;

FIG. 5 is a rear elevational view of the device of FIG. 1;

FIG. 6 is a vertical section, partially broken away, of the device of FIG. 1 taken on the plane indicated by the line 6—6 of FIG. 1;

DETAILED DESCRIPTION

Figure 7:
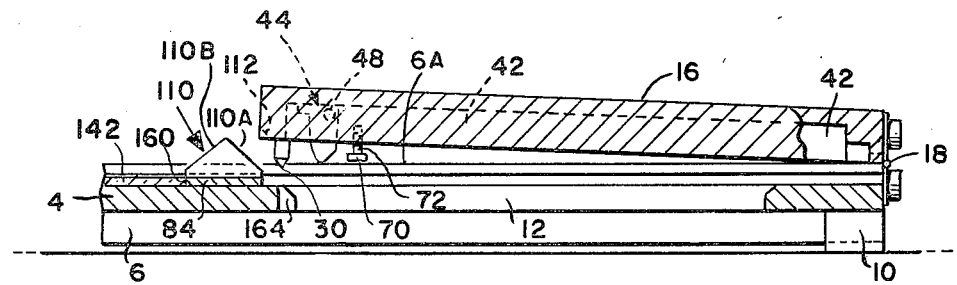
FIG. 7 is a side elevation of the device of FIG. 1, partially broken away, showing the pusher in the fully withdrawn position.
Figure 8:
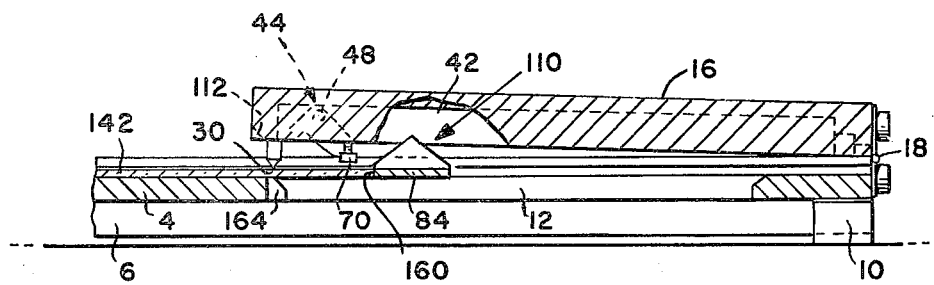
FIG. 8 is a side elevation of the device of FIG. 1, partially broken away, showing the pusher in a partially advanced position.
Figure 9:
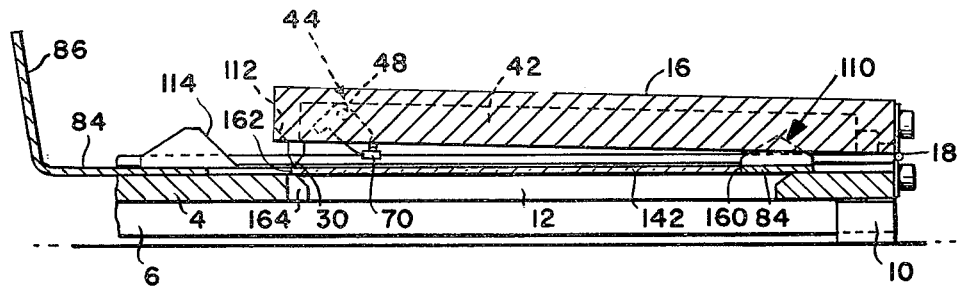
FIG. 9 is a side elevation of the device of FIG. 1, partially broken away, showing the pusher still further advanced.

A device 2 in accordance with the invention has a horizontal bed 4 with side walls 6 and 8 extending above and below the bed and having upper flanges 6A and 8A respectively. Side walls 6 and 8 are supported by rubber feet 10. Bed 4 has a longitudinally extending opening 12 (FIG. 1).

An arm 16 overlying bed 4 is pivoted to bed 4 by a piano hinge 18 secured by screws 20 (FIG. 5). A knob 22 is provided for pivoting arm 16 and is secured thereto by an adhesive indicated at 24 (FIG. 3). Knob 22 has a cavity 26 for the accommodation of a threaded member 28 which has inset by a pressed fit into opening 29 in its lower end a diamond cutter 30 (FIG. 3A). Threaded member 28 is threaded to a threaded opening 32 in arm 16 and is secured in the desired position by a lock nut 34. Cutter 30 and inner edge 40 of opening 12 (FIG. 1) lie in the same vertical plane which contains the centerline of the device 2.

Figure 14:
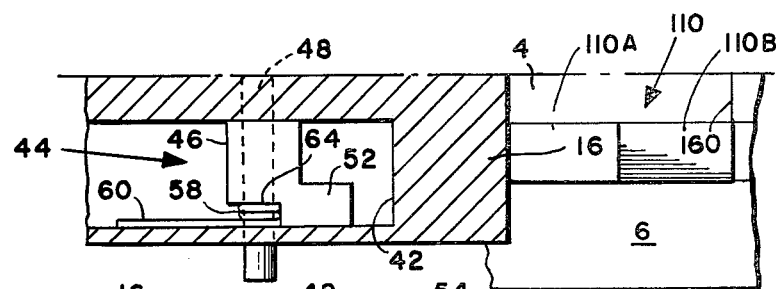
FIG. 14 is a top plan view of the trip lever shown in FIG. 13.
Figure 13:
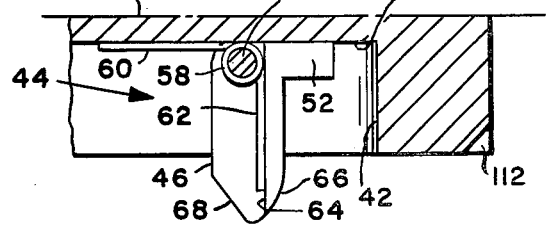
FIG. 13 is a vertical section taken on the plane indicated by the line 13—13 in FIG. 1, partially broken away, showing the spring biased trip lever.
Figure 15:
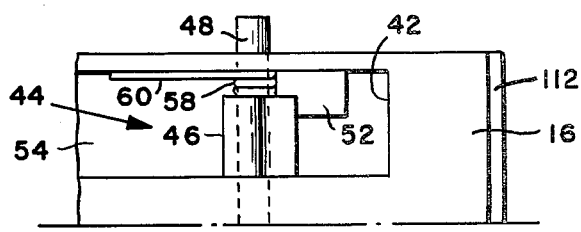
FIG. 15 is a bottom plan view of the trip lever of FIG. 13.

Arm 16 has a longitudinal groove 42 open at its bottom (FIGS. 1, 7 and 15). Groove 42 contains a trip lever 44 (FIG. 6) having a depending arm 46 pivotly mounted on a pin 48 secured to arm 16 on either side of groove 42. Arm 46 has a horizontally extending portion 52 (FIGS. 13-15) adapted to abut against the top 54 of groove 42 when the lever 44 is in its arm supporting position at which time arm 46 rests on flange 6A to maintain arm 16 in an elevated position with cutter 30 above bed 4 (FIG. 7). Trip lever 44 is biased to the supporting position by a coil spring 58 (FIG. 13) having one arm 60 lying against the top 54 of groove 42 and its other arm 62 lying against a shoulder 64 on arm 46. Arm 46 has an arcuate front face 66 (FIG. 13) and a chamfered rear face 68.

Arm 16 is also provided with a striker 70 (FIG. 3) having a threaded shank 72 which is threadably engaged to arm 16. A recess 74 in arm 16 (FIG. 2) accommodates freely a hold down paw 76 which is secured to wall 8 by machine screws 78.

A pusher 84 (FIG. 1) rests on bed 4. Pusher 84 has a handle 86 and an opening 88 for the reception of a microscope slide 92 resting on bed 4. A small opening 94 communicating with the front of opening 88, and above opening 95 in bed 4 when pusher 84 is withdrawn, facilitates the placing of microscope slide 92 on bed 4 within opening 88. Pusher 84 lies under a flange 6A and 8A. The withdrawal of pusher 84 from bed 4 is normally prevented by the engagement of a washer 104 with front edge 102 of slide 84 (FIGS. 1 and 4), the washer being retained in position by a machine screw 106 screwed into wall 6.

Figure 11:
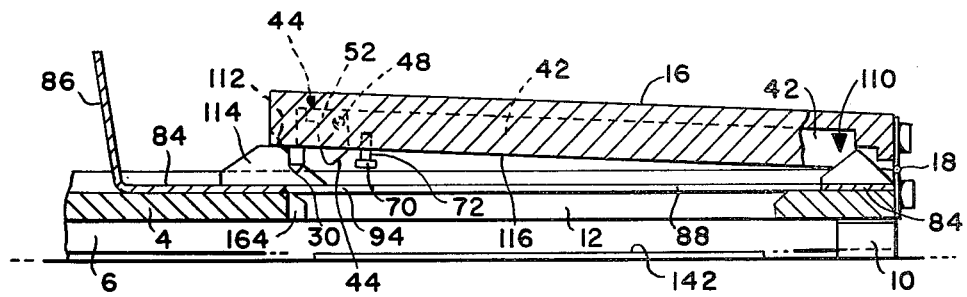
FIG. 11 is a side elevation of the device of FIG. 1, partially broken away, showing the pusher fully advanced.

A cam 110 mounted on the rear end of pusher 84 has a face 110A adapted to engage arcuate face 66 of arm 46 and trip lever 44 from its supporting position so that gravity will cause arm 16 to pivot downwardly until the cutter 30 rests on slide 92. A cam 114 mounted on the front end of pusher 84 is adapted to engage beveled face 112 (FIG. 6) of arm 16 and cam arm 16 upwardly to permit spring 62 to restore lever 44 to its position for supporting arm 16 (FIG. 11).

Figure 12:
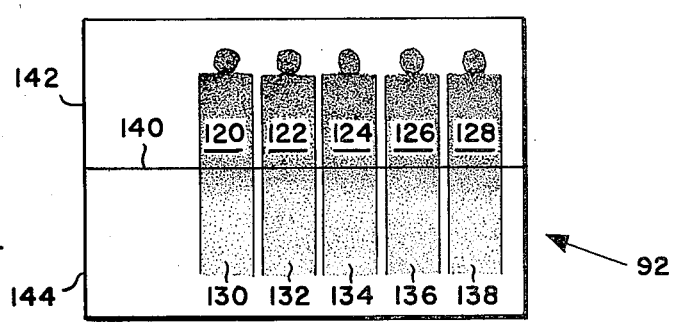
FIG. 12 is a plan view of a microscope slide having five blood smears on it.

Slide 92 has five blood smears 120, 122, 124, 126 and 128 with the monolayer ends indicated at 130, 132, 134, 136 and 138 (FIG. 12). Slide 92 in FIG. 12 is shown after a score 140 has been cut in it dividing it into sections 142 and 144 with the latter section containing the monolayers. Typically, slide 92 would be 50×75 mm. and each section 25×75 mm.

OPERATION

Figure 10:
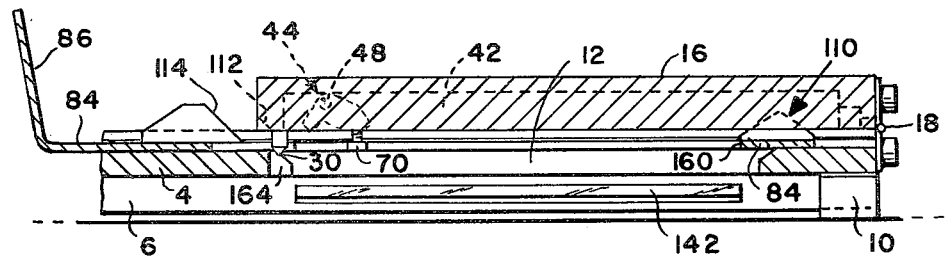
FIG. 10 is a side elevation of the device of FIG. 1, partially broken away, showing the pusher still further advanced with the microscope slide cut and severed into two separate sections, one of which is dropping below the bed of the device.

In operation, pusher 84 is placed in the fully withdrawn position shown in FIG. 1 and a microscope slide 92 is placed on bed 4 within the confines of pusher opening 88. Slide 92 is oriented in order that section 142 will be carried by pusher 84 over opening 12 and section 144 containing the monolayers will be withdrawn by the pusher after the sections are separated. Handle 86 is then used to advance pusher 84 towards arm 16 causing cam face 110A to engage trip lever 44 and pivot it against the force exerted by spring 58 to a position where arm 46 is no longer supporting arm 16 on flange 6A causing gravity to pivot arm 16 downwardly about hinge 18 which lowers cutter 30 into contact with microscope slide 92 adjacent its leading edge 160. Cam 110 is received in slot 42. The continued advance of pusher 84 causes the slide 92 to be passed under cutter 30 causing the cutter 30 to cut score 140 in slide 92 (FIG. 12) immediately over edge 40 of opening 12 and dividing the slide into two sections 142 and 144 (FIG. 12), one of which overlies opening 12. As cutter 30 drops off the trailing end 162 of slide 92, arm 16 pivots downwardly with striker 70 striking section 142 of slide 92 overlying opening 12 while section 144 is held down by paw 76 causing section 142 to separate from the section 144 of the slide along the score cut by cutter 30 and drop through opening 12 as shown in FIG. 10. Cutter 30 is accommodated in an opening 164 communicating with opening 12 in bed 4 (FIG. 10) to reduce the wear of cutter 30. Arm 16 rests on walls 6 and 8.

The continued advance of pusher 84 brings cam 114 into contact with beveled face 112 of arm 16 (FIGS. 1 and 11) and cams arm 16 upwardly sufficiently far to permit spring 58 to rotate trip lever 44 until portion 52 abuts against the top 54 of slot 42 (FIG. 11) in which position trip lever 44 is again ready to support arm 16 on flange 6A. Pusher 84 is then withdrawn to its original position carrying the remaining monolayer section 144 of slide 92 with it and permitting gravity to lower arm 16 so that trip lever 44 rests on flange 6A (FIG. 3) to maintain the cutter 30 above section 144 of the slide 92 and above pusher 84 during withdrawal of pusher 84 to protect slide section 144 and maintain cutter 30 out of contact with pusher 84. As pusher 84 is withdrawn cam face 110B of cam 110 engages face 68 of lever 44 causing lever 44 and hence arm 16 to move upwardly sufficiently for cam 110 to pass by lever 44. Section 144 os slide 92 is then removed for study.

When it is desired to thoroughly clean the device 2, pusher 84 is readily removed by removing screw 106 and washer 104 which permits the withdrawal of pusher 84 from bed 4.

It will be understood that the above-described embodiment is illustrative and is not intended to be limiting.

I claim:

1. A device for separating a microscope slide into two separate sections comprising:
    an arm mounted on a horizontal pivot,
    a downwardly extending glass cutter mounted on the arm,
    releasable means to maintain the arm in a partially elevated position,
    means for advancing a slide under the cutter,
    means for releasing the releasable means to lower the arm to bring the cutter into contact with the slide to cut the slide along a line dividing the slide into two sections as the means for advancing is advanced, and
    means connected to the arm for striking one section of the slide to separate it from the other section as the cutter drops off the trailing edge of the slide.

2. A device in accordance with claim 1 in which the releasable means is a spring biased trip lever.

3. A device in accordance with claim 1 in which the cutter is a diamond.

4. A device for separating a microscope slide into two separate sections comprising:
    a bed adapted to support a microscope slide,
    an arm pivoted to the bed and overlying the bed,
    a downwardly extending glass cutter mounted on the arm,
    a spring biased trip lever mounted on the arm for supporting the arm with the cutter above the bed and spring biased into the supporting position,
    a pusher for advancing a slide resting on the bed under the cutter,
    means connected to the pusher for tripping the trip lever as the leading edge of the slide passes under the cutter to lower the cutter onto the slide to cut the slide along a line dividing the slide into two sections as it is advanced by the pusher,
    a downwardly extending striking member mounted on the arm for striking one of the sections of the slide as the cutter drops off the trailing edge of the slide to sever the slide along the cut made by the cutter to separate the sections, said bed having an opening for the downward passage of said one section of the slide struck by the striking member, and
    means on the pusher to raise the arm after the slide is struck by the striker to permit the trip arm to be biased back to its supporting position.

5. The device of claim 4 in which the cutter is a diamond.

6. The device of claim 4 in which the bed is mounted on supporting means for maintaining the bed in an elevated position to permit the slide section passing through the opening to drop below the bed.

7. The device of claims 4 or 6 in which the bed has an opening for the reception of the cutter when it drops off the trailing edge of a slide to prevent dulling of the cutter.

8. The device of claims 4 or 6 having a paw extending over the bed to overlie the section of a slide which is not struck by the striker to hold down said section when the other section is struck.

9. The device of claims 4 or 6 having removable means for restraining the pusher from withdrawal from the bed to provide for withdrawal of the pusher from the bed in order to clean the pusher and the bed.

10. The device of claim 4 in which the tripping means is a cam.

11. The device of claims 4 or 10 in which the means to raise the arm is a cam.

12. The device of claim 4 in which one edge of the opening is adapted to support the cut edge of said other section of the slide.

13. The device of claim 4 having cam means for controlling the lowering of the arm after the trip lever is tripped.

* * * * *